US012325238B2

(12) United States Patent
Kumagai et al.

(10) Patent No.: US 12,325,238 B2
(45) Date of Patent: Jun. 10, 2025

(54) PRINTING APPARATUS

(71) Applicant: SEIKO EPSON CORPORATION, Tokyo (JP)

(72) Inventors: Masaru Kumagai, Shiojiri (JP); Shinichi Nakamura, Okaya (JP); Eiichiro Watanabe, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 157 days.

(21) Appl. No.: 18/183,441

(22) Filed: Mar. 14, 2023

(65) Prior Publication Data

US 2023/0294410 A1 Sep. 21, 2023

(30) Foreign Application Priority Data

Mar. 15, 2022 (JP) ................................ 2022-040460

(51) Int. Cl.
*B41J 2/165* (2006.01)

(52) U.S. Cl.
CPC ....... *B41J 2/16538* (2013.01); *B41J 2/16541* (2013.01)

(58) Field of Classification Search
CPC ................ B41J 2/16538; B41J 2/16541; B41J 2/16517; B41J 2/16535
USPC ........................................................... 347/33
See application file for complete search history.

(56) References Cited

U.S. PATENT DOCUMENTS

2003/0071872 A1* 4/2003 Temple ................ B41J 2/16538 347/33
2010/0245466 A1* 9/2010 Inoue .................. B41J 2/16585 347/30
2022/0266521 A1 8/2022 Hasegawa et al.
2022/0266529 A1 8/2022 Hasegawa et al.
2022/0266530 A1 8/2022 Kumagai et al.
2022/0288846 A1 9/2022 Nakamura et al.
2022/0288863 A1 9/2022 Nakamura et al.

FOREIGN PATENT DOCUMENTS

JP 2017-140727 A 8/2017
JP 2022-127793 A 9/2022
JP 2022-127794 A 9/2022
JP 2022-127795 A 9/2022
JP 2022-137548 A 9/2022
JP 2022-137549 A 9/2022

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A printing apparatus includes: a wiping member extending along a first axis; a head including a nozzle surface; and a movement mechanism configured to change a relative positional relationship between the wiping member and the head, and the printing apparatus executes a first wiping operation that changes a position of the head relative to the wiping member along a second axis intersecting the first axis, with the nozzle surface and a first wiping area of the wiping member in contact with each other, and a second wiping operation that changes the position of the head relative to the wiping member along the second axis, with the nozzle surface and a second wiping area of the wiping member in contact with each other, the second wiping area being located at a position different from a position of the first wiping area in a direction along the first axis.

9 Claims, 8 Drawing Sheets

PRINTING APPARATUS

The present application is based on, and claims priority from JP Application Serial Number 2022-040460, filed Mar. 15, 2022, the disclosure of which is hereby incorporated by reference herein in its entirety.

BACKGROUND

1. Technical Field

The present disclosure relates to printing apparatuses.

2. Related Art

Some printing apparatuses typified by ink jet printers have a configuration for wiping ink that remains on a nozzle surface having nozzles for ejecting ink. For example, JP-A-2017-140727 discloses a configuration in which a wiper including an elastic part is used to wipe ink remaining on the nozzle surface.

In JP-A-2017-140727, the same portion of the wiper is continuously and repeatedly used to wipe ink remaining on the nozzle surface. Thus, when this operation is repeated, this configuration has a problem in which the ink that has adhered to the wiper in the previous operation adheres again to the nozzle surface, thereby reducing the wiping effect.

SUMMARY

To solve the above problem, an aspect of the printing apparatus according to the present disclosure includes: a wiping member extending along a first axis; a head including a nozzle surface having a nozzle configured to eject liquid; and a movement mechanism configured to change a relative positional relationship between the wiping member and the head, and the printing apparatus executes a first wiping operation that changes a position of the head relative to the wiping member along a second axis intersecting the first axis, with the nozzle surface and a first wiping area of the wiping member in contact with each other, and a second wiping operation that changes the position of the head relative to the wiping member along the second axis, with the nozzle surface and a second wiping area of the wiping member in contact with each other, the second wiping area being located at a position different from a position of the first wiping area in a direction along the first axis.

DESCRIPTION OF EXEMPLARY EMBODIMENTS

Figure 1:
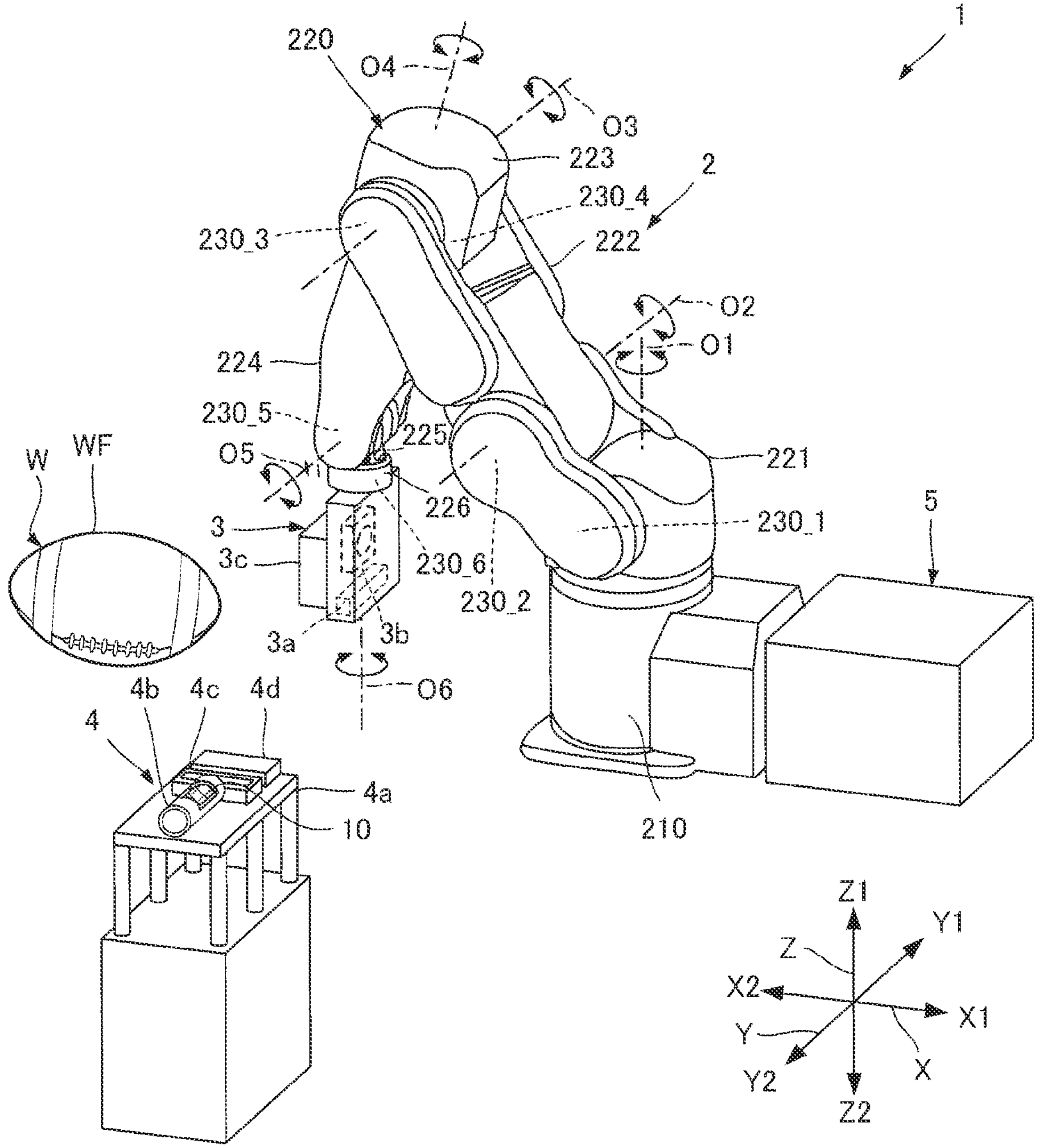
FIG. 1 is a perspective view of a printing apparatus according to a first embodiment illustrating an overall configuration.

Hereinafter, preferred embodiments according to the present disclosure will be described with reference to the attached drawings. Note that the dimensions and reduced scale of each portion in the drawings differ from actual ones as appropriate, and some parts are schematically illustrated to facilitate understanding. The scope of the present disclosure is not limited to these embodiments unless specifically stated in the following description as limiting the present disclosure.

For convenience, the following description uses an X-axis, a Y-axis, and a Z-axis intersecting one another as necessary. In the following description, one direction along the X-axis is the X1 direction, and the direction opposite to the X1 direction is the X2 direction. Similarly, the directions opposite to each other along the Y-axis are the Y1 direction and the Y2 direction. The directions opposite to each other along the Z-axis are the Z1 direction and the Z2 direction.

Here, the X-axis, the Y-axis, and the Z-axis correspond to the coordinate axes of the world coordinate system set in the space in which a robot 2 described later is provided. Typically, the Z-axis is the vertical axis, and the Z2 direction corresponds to the vertically downward direction. A base coordinate system based on the position of a base portion 210 of the robot 2 described later is set to be associated with the world coordinate system by calibration. For convenience, the following describes an example in which the operation of the robot 2 is controlled by using the world coordinate system as the robot coordinate system.

Note that the Z-axis is not limited to being the vertical axis. In addition, although the X-axis, the Y-axis, and the Z-axis are typically orthogonal to one another, the disclosure is not limited to these axes. There are also cases in which the axes are not orthogonal to one another. For example, the X-axis, the Y-axis, and the Z-axis have only to intersect one another at angles within the range of 80° to 100°, inclusive.

1. First Embodiment

1-1. Overall Configuration of Printing Apparatus

FIG. 1 is a perspective view of a printing apparatus 1 according to a first embodiment for illustrating the overall configuration. The printing apparatus 1 is configured to perform printing on the surface of a three-dimensional workpiece W by using an ink jet method.

The workpiece W has a print target surface WF. In the example illustrated in FIG. 1, the workpiece W has a prolate rugby ball shape, and the surface WF is a curved surface. During printing, the workpiece W is supported as necessary by a structure, such as a specified placement table, a robot hand, a conveyor, or the like. Note that the parameters of the workpiece W or the surface WF such as the shape and the size are not limited to the example illustrated in FIG. 1 and can be any parameters. During printing, the position or orientation of the workpiece W or the surface WF need only be one that enables printing. The position or orientation is not limited to the example illustrated in FIG. 1 and can be any position or orientation.

As illustrated in FIG. 1, the printing apparatus 1 includes the robot 2 which is an example of a movement mechanism, a head unit 3, a maintenance unit 4, and a controller 5. First, these will be briefly explained in order below.

The robot 2 is configured to change the position and orientation of the head unit 3 in the world coordinate system. In the example illustrated in FIG. 1, the robot 2 is a so-called 6-axis vertical articulated robot.

As illustrated in FIG. 1, the robot 2 includes the base portion 210 and an arm portion 220.

The base portion 210 is a stand that supports the arm portion 220. In the example illustrated in FIG. 1, the base portion 210 is fixed by screwing or the like to an installation surface facing the Z1 direction such as a floor surface or a base table. Note that the installation surface to which the base portion 210 is fixed is not limited to the example illustrated in FIG. 1 and may be a surface facing any direction. For example, the installation surface may be a wall, a ceiling, or a surface of a movable cart or the like.

The arm portion 220 is a 6-axis robot arm including a proximal end attached to the base portion 210 and a distal end whose three-dimensional position and orientation changes relative to the proximal end. Specifically, the arm portion 220 includes arms 221, 222, 223, 224, 225, and 226, which are coupled to one another in this order.

The arm 221 is coupled to the base portion 210 via a joint portion 230_1 so as to be rotatable around a rotation axis O1 relative to the base portion 210. The arm 222 is coupled to the arm 221 via a joint portion 230_2 so as to be rotatable around a rotation axis O2 relative to the arm 221. The arm 223 is coupled to the arm 222 via a joint portion 230_3 so as to be rotatable around a rotation axis O3 relative to the arm 222. The arm 224 is coupled to the arm 223 via a joint portion 230_4 so as to be rotatable around a rotation axis O4 relative to the arm 223. The arm 225 is coupled to the arm 224 via a joint portion 230_5 so as to be rotatable around a rotation axis O5 relative to the arm 224. The arm 226 is coupled to the arm 225 via a joint portion 230_6 so as to be rotatable around a rotation axis O6 relative to the arm 225.

Each of the joint portions 230_1 to 230_6 is a mechanism that couples one of the two members adjoining each other, of the base portion 210 and the arms 221 to 226, to the other such that the one member is rotatable relative to the other. In the following description, each of the joint portions 230_1 to 230_6 may sometimes be referred to as "joint portion 230".

Although not illustrated in FIG. 1, each of the joint portions 230_1 to 230_6 has a driving mechanism that rotates one of the corresponding two members adjoining each other relative to the other. The driving mechanism includes, for example, a motor that generates a driving force for the rotation, a decelerator that decelerates the driving force and outputs the resultant, and an encoder, such as a rotary encoder, that detects the amount of the rotation operation such as the angle. Note that the aggregate of the driving mechanisms of the joint portions 230_1 to 230_6 corresponds to an arm driving mechanism 2*a* illustrated in FIG. 2 described later.

The rotation axis O1 is the axis perpendicular to the installation surface (not illustrated) to which the base portion 210 is fixed. The rotation axis O2 is an axis perpendicular to the rotation axis O1. The rotation axis O3 is an axis parallel to the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, the meaning of "perpendicular" includes not only the case in which the angle between two rotation axes is strictly 90° but also cases in which the angle between two rotation axes has a deviation within a range of ±5° or so relative to 90°. Similarly, the meaning of "parallel" includes not only the case in which two rotation axes are strictly parallel but also cases in which one of two rotation axes is inclined relative to the other by an angle within a range of ±5° or so.

The head unit 3 is fixed as an end effector by screwing or the like to the arm 226 located at the most distal end of the arm portion 220 of the robot 2 described above.

The head unit 3 is an assembly including a head 3*a* that ejects ink, which is an example of a liquid, toward the workpiece W. In the present embodiment, the head unit 3 includes not only the head 3*a* but also a pressure adjustment valve 3*b* and a curing light source 3*c*. Details of the head unit 3 will be described in accordance with FIG. 3 described later.

The head unit 3 is supplied with ink from an ink tank (not illustrated) via a pipe (not illustrated). The type of the ink is not limited to any specific one, and examples of the ink include a water-based ink in which a coloring material such as a dye or a pigment is dissolved in a water-based solvent, a curable ink containing a curable resin such as an ultraviolet curable resin, and a solvent-based ink in which a coloring material such as a dye or a pigment is dissolved in an organic solvent. Of these, a curable ink may be preferably used. The type of curable ink is not limited to any specific one. For example, the curable ink may be any one of a thermosetting type, a photo-curing type, a radiation-curing type, and an electro-beam-curing type, but a photo-curing type such as an ultraviolet curable type may be preferably used. Note that the ink is not limited to a solution and may be an ink in which a coloring material or the like is dispersed as a dispersoid in a dispersion medium. The ink is not limited to an ink containing a coloring material and may also be, for example, an ink containing, as a dispersoid, conductive particles, such as metal particles, to form wiring or the like, a clear ink, or a treatment liquid for treating the surface of the workpiece W.

The maintenance unit 4 is a mechanism for performing maintenance of the head 3*a* of the head unit 3. In the example illustrated in FIG. 1, the maintenance unit 4 includes a support table 4*a*, a wiping mechanism 4*b*, a suction cap 4*c*, and a plate cap 4*d*. The support table 4*a* supports the wiping mechanism 4*b*, the suction cap 4*c*, and the plate cap 4*d*, one or more of which are selected as necessary, and maintenance of the head 3*a* is performed at appropriate times. Here, the wiping mechanism 4*b* includes a wiping member 10 and a support member 11. Details of the maintenance unit 4 will be described later in accordance with FIGS. 4 to 8.

The controller 5 is a robot controller that controls driving of the robot 2. The electrical configuration of the printing apparatus 1 will be described below in accordance with FIG. 2, including a detailed description of the controller 5.

1-2. Electrical Configuration of Printing Apparatus

Figure 2:
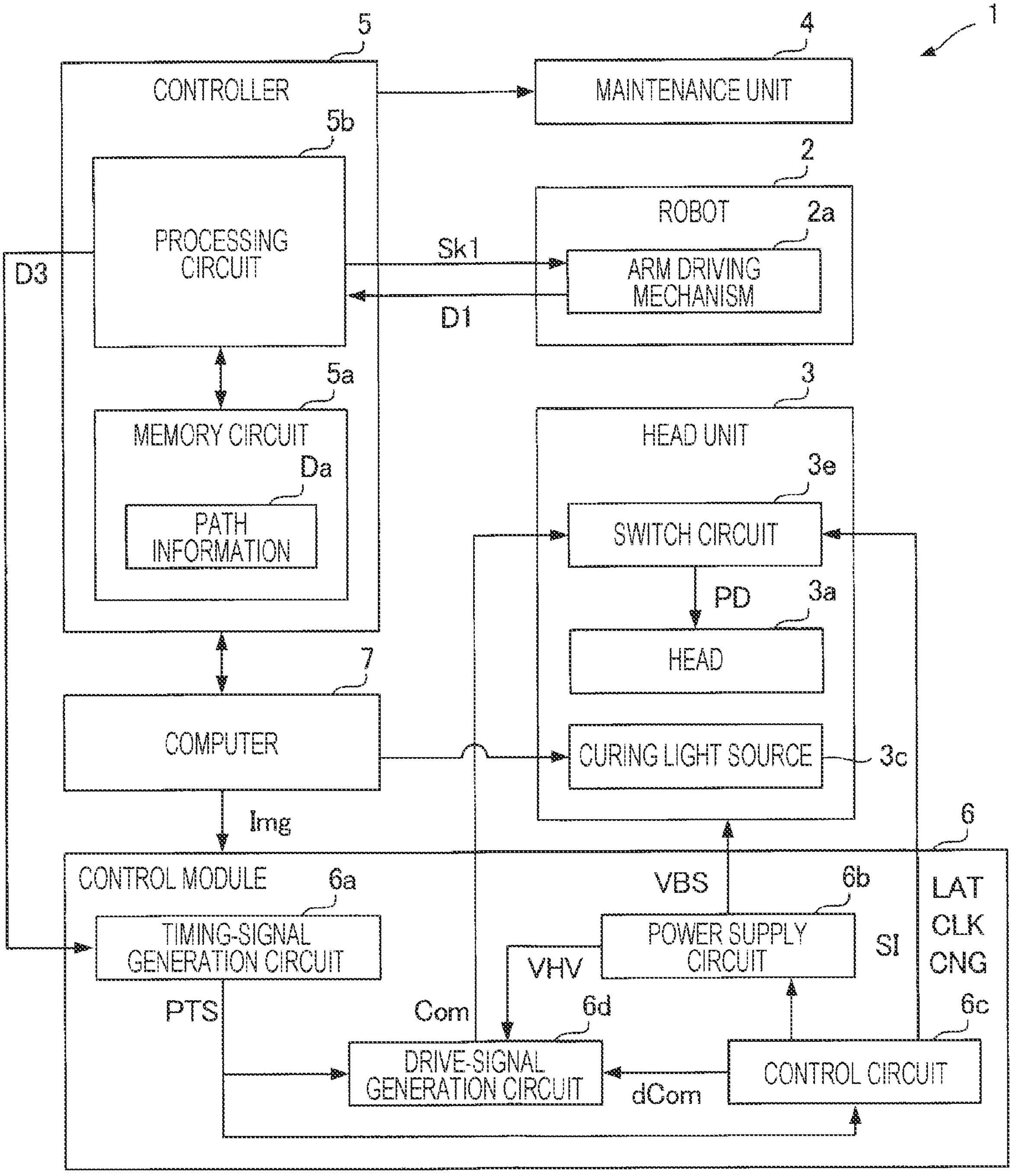
FIG. 2 is a block diagram illustrating the electrical configuration of the printing apparatus according to the first embodiment.

FIG. 2 is a block diagram illustrating the electrical configuration of the printing apparatus 1 according to the first embodiment. FIG. 2 illustrates electrical components of the components of the printing apparatus 1. As illustrated in FIG. 2, the printing apparatus 1 includes not only the components illustrated in the foregoing FIG. 1 but also a control module 6 communicably coupled to the controller 5 and a computer 7 communicably coupled to the controller 5 and the control module 6. Before describing the controller 5 in detail, first, the control module 6 and the computer 7 will be described in order below.

Note that each of the electrical components illustrated in FIG. 2 may be divided as appropriate, part of a component may be included in another, and a component may be integrated with another. For example, some or all of the functions of the controller 5 or the control module 6 may be implemented by the computer 7 or may be implemented by another external apparatus such as a personal computer (PC) coupled to the controller 5 via a network such as a local area network (LAN) or the Internet.

The controller 5 has a function of controlling driving of the robot 2 and a function of generating a signal D3 for synchronizing the ink ejection operation of the head unit 3 with the operation of the robot 2. Although the controller 5 of the present embodiment also includes a function of controlling driving of the maintenance unit 4, this function may be implemented by another device such as the computer 7.

The controller 5 includes a memory circuit 5*a* and a processing circuit 5*b*.

The memory circuit 5*a* stores various programs that the processing circuit 5*b* executes and various kinds of data that the processing circuit 5*b* processes. The memory circuit 5*a* includes, for example, one type or both types of semiconductor memory: volatile memory such as random access memory (RAM) and nonvolatile memory such as read-only memory (ROM), electrically erasable programmable read-only memory (EEPROM), and programmable ROM (PROM). Note that part or all of the memory circuit 5*a* may be included in the processing circuit 5*b*.

The memory circuit 5*a* stores path information Da. The path information Da is information that indicates the path along which the head unit 3 is to move and the orientation of the head unit 3 along the path. Here, the path information Da includes, as information on the path and the orientation, information on the movement path and orientation of the head unit 3 at the time when the head unit 3 performs printing on the workpiece W and information on the movement path and orientation of the head unit 3 between the position during printing and the position during maintenance by the maintenance unit 4. The path information Da is determined in accordance with, for example, the shape or the like of the workpiece W and expressed by using the coordinate values in the base coordinate system or the world coordinate system. The shape of the workpiece W can be determined from, for example, computer-aided design (CAD) data that expresses the three-dimensional shape of the workpiece W. The path information Da mentioned above is input from the computer 7 into the memory circuit 5*a*.

The processing circuit 5*b* controls the operation of the arm driving mechanism 2*a* of the robot 2 in accordance with the path information Da and also generates the signal D3. The processing circuit 5*b* includes, for example, one or more processors such as central processing units (CPUs). Note that the processing circuit 5*b* may include, instead of or in addition to the CPUs, a programmable logic device such as a field-programmable gate array (FPGA).

Here, the arm driving mechanism 2*a* is the aggregate of the driving mechanisms of the foregoing joint portions 230_1 to 230_6 and includes, per joint portion, a motor for driving the joint portion 230 of the robot 2 and an encoder that detects the rotation angle of the joint portion 230 of the robot 2.

The processing circuit 5*b* performs an inverse kinematics calculation which is an operation that converts the path information Da into values of the operation parameters such as the rotation angle and the rotation speed of each joint portion 230 of the robot 2. Then, the processing circuit 5*b* outputs a control signal Sk1 in accordance with the output D1 from each encoder of the arm driving mechanism 2*a* such that the actual value of an operation parameter such as the rotation angle or the rotation speed of each joint portion 230 follows the foregoing calculation results in accordance with the path information Da. The control signal Sk1 is for controlling driving of the motors of the arm driving mechanism 2*a*. Here, the control signal Sk1 is corrected as necessary by the processing circuit 5*b* in accordance with the output from a distance sensor 3*d*.

The processing circuit 5*b* generates the signal D3 in accordance with the output D1 from at least one of the encoders of the arm driving mechanism 2*a*. For example, the processing circuit 5*b* generates a trigger signal, as the signal D3, including a pulse at the time when the output D1 from one of the encoders becomes a specified value.

The control module 6 is a circuit that controls the ink ejection operation of the head unit 3 in accordance with the signal D3 output from the controller 5 and print data from the computer 7. The control module 6 includes a timing-signal generation circuit 6*a*, a power supply circuit 6*b*, a control circuit 6*c*, and a drive-signal generation circuit 6*d*.

The timing-signal generation circuit 6*a* generates a timing signal PTS in accordance with the signal D3. The timing-signal generation circuit 6*a* includes, for example, a timer that starts generating the timing signal PTS with the detection of the signal D3 as a trigger.

The power supply circuit 6*b* is supplied with electric power from a commercially available power supply (not illustrated) and generates various specified electric potentials. The various generated electric potentials are supplied as appropriate to some parts of the control module 6 and the head unit 3. For example, the power supply circuit 6*b* generates a power supply potential VHV and an offset potential VBS. The offset potential VBS is supplied to the head unit 3. The power supply potential VHV is supplied to the drive-signal generation circuit 6*d*.

The control circuit 6*c* generates a control signal SI, a waveform specifying signal dCom, a latch signal LAT, a clock signal CLK, and a change signal CNG in accordance with the timing signal PTS. These signals are synchronized with the timing signal PTS. Of these signals, the waveform specifying signal dCom is input to the drive-signal generation circuit 6*d*, and the other signals are input to a switch circuit 3*e* of the head unit 3.

The control signal SI is a digital signal for specifying the operational state of each drive element included in the head 3*a* of the head unit 3. Specifically, the control signal SI specifies whether to supply a drive signal Com described later to the drive element. This specification determines, for example, whether to eject ink from the nozzle corresponding to the drive element and the amount of ink to be ejected from the nozzle. The waveform specifying signal dCom is a digital signal for defining the waveform of the drive signal Com. The latch signal LAT and the change signal CNG, which are used in parallel with the control signal SI, define the drive timing of the drive element, which defines the ejection timing of ink from the nozzle. The clock signal CLK is a clock signal synchronized with the timing signal PTS and serving as a reference.

The control circuit 6*c* mentioned above includes, for example, one or more processors such as central processing units (CPUs). Note that the control circuit 6*c* may include, instead of or in addition to the CPUs, a programmable logic device such as a field-programmable gate array (FPGA).

The drive-signal generation circuit 6*d* is configured to generate the drive signal Com for driving each drive element included in the head 3*a* of the head unit 3. Specifically, the drive-signal generation circuit 6*d* includes, for example, a DA conversion circuit and an amplifier circuit. In the drive-signal generation circuit 6*d*, the DA conversion circuit converts the waveform specifying signal dCom from the control circuit 6*c*, which is a digital signal, into an analog signal, and the amplifier circuit amplifies the analog signal by using the power supply potential VHV from the power supply circuit 6*b*. The drive signal Com is thus generated. Here, of the waveforms included in the drive signal Com, the signal with the waveform to be actually supplied to the drive element is a drive pulse PD. The drive pulse PD is supplied from the drive-signal generation circuit 6*d* to the drive element via the switch circuit 3*e* of the head unit 3.

Here, the switch circuit 3*e* is configured to perform switching depending on whether to supply at least part of the waveforms included in the drive signal Com as drive pulses PD in accordance with the control signal SI.

The computer 7 has a function of supplying the controller 5 with information such as the path information Da and a function of supplying the control module 6 with information such as print data. The computer 7 of the present embodiment has, in addition to these functions, a function of controlling driving of the curing light source 3*c*. The computer 7 is, for example, a desktop computer, a laptop computer, or the like in which a program for implementing these functions is installed.

1-3. Configuration of Head Unit

Figure 3:
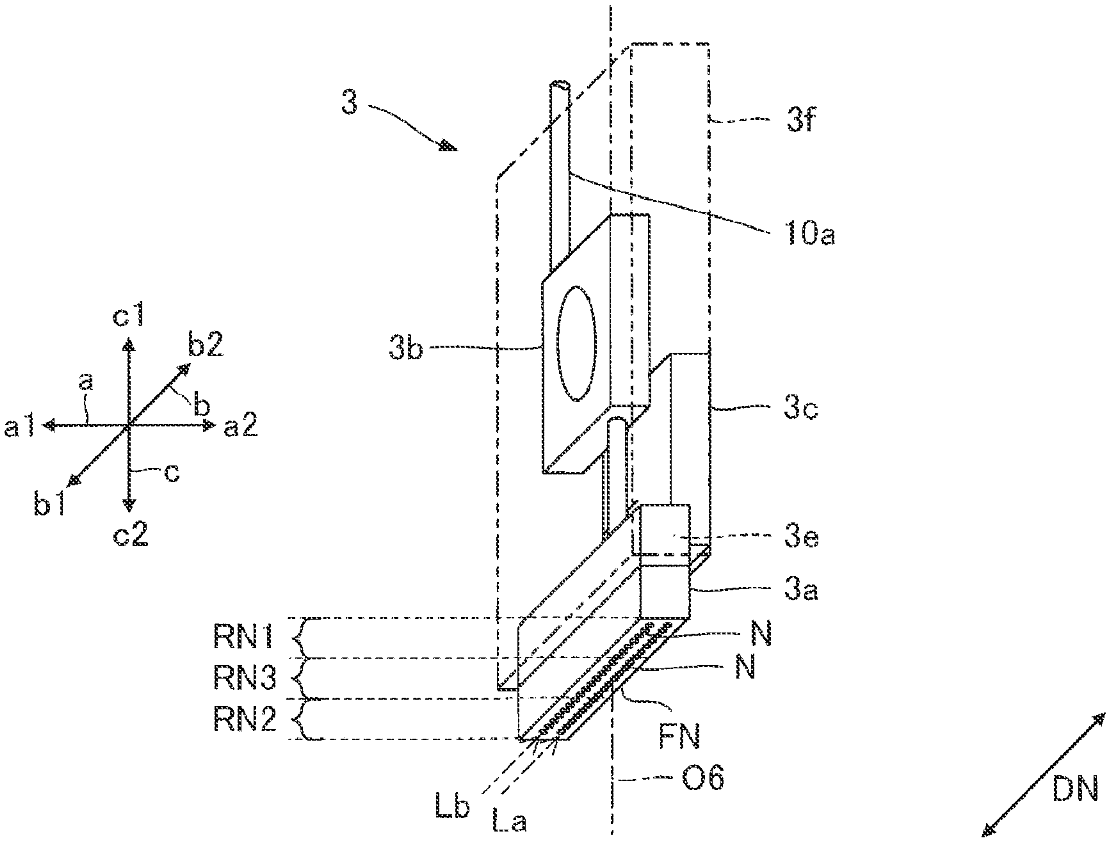
FIG. 3 is a perspective view of a head unit illustrating its schematic configuration.

FIG. 3 is a perspective view of the head unit 3 illustrating its schematic configuration. For convenience, the following description uses an a-axis, a b-axis, and a c-axis intersecting one another as necessary. In the following description, one direction along the a-axis is the a1 direction, and the direction opposite to the a1 direction is the a2 direction. Similarly, the directions opposite to each other along the b-axis are the b1 direction and the b2 direction. The directions opposite to each other along the c-axis are the c1 direction and the c2 direction.

Here, the a-axis, the b-axis, and the c-axis correspond to the coordinate axes of the tool coordinate system set to the head unit 3, and the relationship with the position and orientation relative to the foregoing world coordinate system or robot coordinate system changes according to the operation of the foregoing robot 2. In the example illustrated in FIG. 3, the c-axis is parallel to the foregoing rotation axis O6. Note that although the a-axis, the b-axis, and the c-axis are typically orthogonal to one another, the disclosure is not limited to these axes. For example, the axes have only to intersect one another at angles within the range of 80° to 100°, inclusive. Note that the tool coordinate system and the base coordinate system or robot coordinate system are set to be associated with each other by calibration. The tool coordinate system is set, for example, such that the center of the nozzle surface FN described later is the reference (tool center point).

The head unit 3 as described earlier includes the head 3*a*, the pressure adjustment valve 3*b*, and the curing light source 3*c*. These are supported by a support 3*f* depicted by the dashed double-dotted lines in FIG. 3. Note that in the example illustrated in FIG. 3, both the number of heads 3*a* and the number of pressure adjustment valves 3*b* included in the head unit 3 are one. These numbers are not limited to the example illustrated in FIG. 3 and may be two or more. The attachment location of the pressure adjustment valve 3*b* is not limited to the arm 226. For example, the pressure adjustment valve 3*b* may be attached to another arm or the like or may be attached at a static location relative to the base portion 210.

The support 3*f* is made of, for example, a metal material or the like and is thus substantially a rigid body. Although the support 3*f* has a flat box shape in FIG. 3, the shape of the support 3*f* is not limited to any specific shapes and may be any shape.

The support 3*f* mentioned above is attached to the foregoing arm 226. Hence, the head 3*a*, the pressure adjustment valve 3*b*, and the curing light source 3*c* are supported together by the arm 226 due to the presence of the support 3*f*. Thus, the positions of the head 3*a*, the pressure adjustment valve 3*b*, and the curing light source 3*c* relative to the arm 226 are fixed. In the example illustrated in FIG. 3, the pressure adjustment valve 3*b* is located at a position in the c1 direction relative to the head 3*a*. The curing light source 3*c* is located at a position in the a2 direction relative to the head 3*a*.

The head 3*a* has a nozzle surface FN and a plurality of nozzles N open in the nozzle surface FN. In the example illustrated in FIG. 3, the direction of the normal line of the nozzle surface FN is the c2 direction, and the plurality of nozzles N are grouped into a nozzle row La and a nozzle row Lb spaced in the direction along the a-axis. Each of the nozzle row La and the nozzle row Lb is a group of nozzles N arranged in a straight line in the direction along the b-axis. Here, in the head 3*a*, the elements related to each nozzle N in the nozzle row La and the elements related to each nozzle N in the nozzle row Lb are substantially symmetrical in the direction along the a-axis. An arrangement direction DN described later is parallel to the b-axis.

Note that the nozzle surface FN is the plate surface of the nozzle plate, or when a second member is located as a component of the head unit 3 on the extension plane of the plate surface, the nozzle surface FN corresponds to the surface including the plate surface of the nozzle plate and the surface of the second member. Here, the nozzle plate is a plate-shaped member made of silicon, a metal, or the like in which a plurality of nozzles N are formed. Examples of the second member include a fixation plate and a cover head. The fixation plate is a member that is provided around the nozzle plate for the purpose of fixing or protecting the nozzle plate or other purposes. The cover head is a member that is provided for the purpose of protecting the head 3*a* or other purposes, and a portion of the cover head is provided around the nozzle plate. Note that depending on the configuration of the head 3*a*, the head 3*a* does not have a fixation plate and a cover head in some cases. In addition, there are cases in which the positions of the surfaces of the fixation plate and the cover head may differ from the position of the plate surface of the nozzle plate in the direction along the c-axis by 0.8 mm or so at maximum. In the example illustrated in FIG. 3, the nozzle surface FN is composed of only the plate surface of the nozzle plate.

Note that the positions of the plurality of nozzles N in the nozzle row La and the positions of the plurality of nozzles N in the nozzle row Lb may be aligned or may differ in the direction along the b-axis. In addition, the elements related to each nozzle N in one of the nozzle row La and the nozzle row Lb may be omitted. The following description is based on an example in which the positions of the plurality of nozzles N in the nozzle row La and the positions of the plurality of nozzles N in the nozzle row Lb are aligned in the direction along the b-axis.

Although not illustrated, the head 3*a* has, per nozzle N, a piezoelectric element as a drive element and a cavity that stores ink. Here, the piezoelectric element changes the pressure of the cavity corresponding to the piezoelectric element to eject ink from the nozzle corresponding to the cavity. The head 3*a* mentioned above can be obtained, for example, by adhering, with an adhesive or the like, a plurality of substrates including a silicon substrate processed as appropriate by etching or the like. Note that instead of the piezoelectric element, a heater that heats the ink in the cavity may be used for the drive element for ejecting ink from the nozzle.

The head 3*a* mentioned above is coupled to an ink tank (not illustrated) via the pressure adjustment valve 3*b*.

The pressure adjustment valve 3*b* is a valve mechanism that opens or closes according to the pressure of the ink in the head 3*a*. With this opening/closing operation, even if the positional relationship between the head 3*a* and the foregoing ink tank (not illustrated) changes, the pressure of the ink in the head 3*a* is kept at a negative pressure within a specified range. This configuration stabilizes the meniscus of ink formed in the nozzle N of the head 3*a*. Thus, it is possible to prevent a situation in which a bubble enters the nozzle N, or in which ink overflows from the nozzle N. The ink from the pressure adjustment valve 3*b* is distributed via branched flow paths (not illustrated) to a plurality of locations in the head 3*a* as appropriate. Here, the ink from the ink tank (not illustrated) is transported to the pressure adjustment valve 3*b* at a specified pressure by a pump (not illustrated) or the like.

The curing light source 3*c* emits energy such as light, heat, an electron beam, radiation, or the like for curing or solidifying the ink on the workpiece W. For example, when the ink has an ultraviolet curing property, the curing light source 3*c* includes a light emitting element or the like such as a light emitting diode (LED) that emits ultraviolet rays. The curing light source 3*c* may have an optical part or the like as appropriate such as a lens for adjusting the emission direction, the emission range, or the like of the energy.

Note that the curing light source 3*c* does not have to completely cure or completely solidify the ink on the workpiece W. In this case, for example, the ink subjected to the energy radiation from the curing light source 3*c* may be completely cured or completely solidified by using energy from a curing light source separately provided on the installation surface of the base portion 210 of the robot 2. The curing light source 3*c* is provided where necessary, or the curing light source 3*c* may be omitted.

1-4. Configuration of Maintenance Unit

Figure 4:
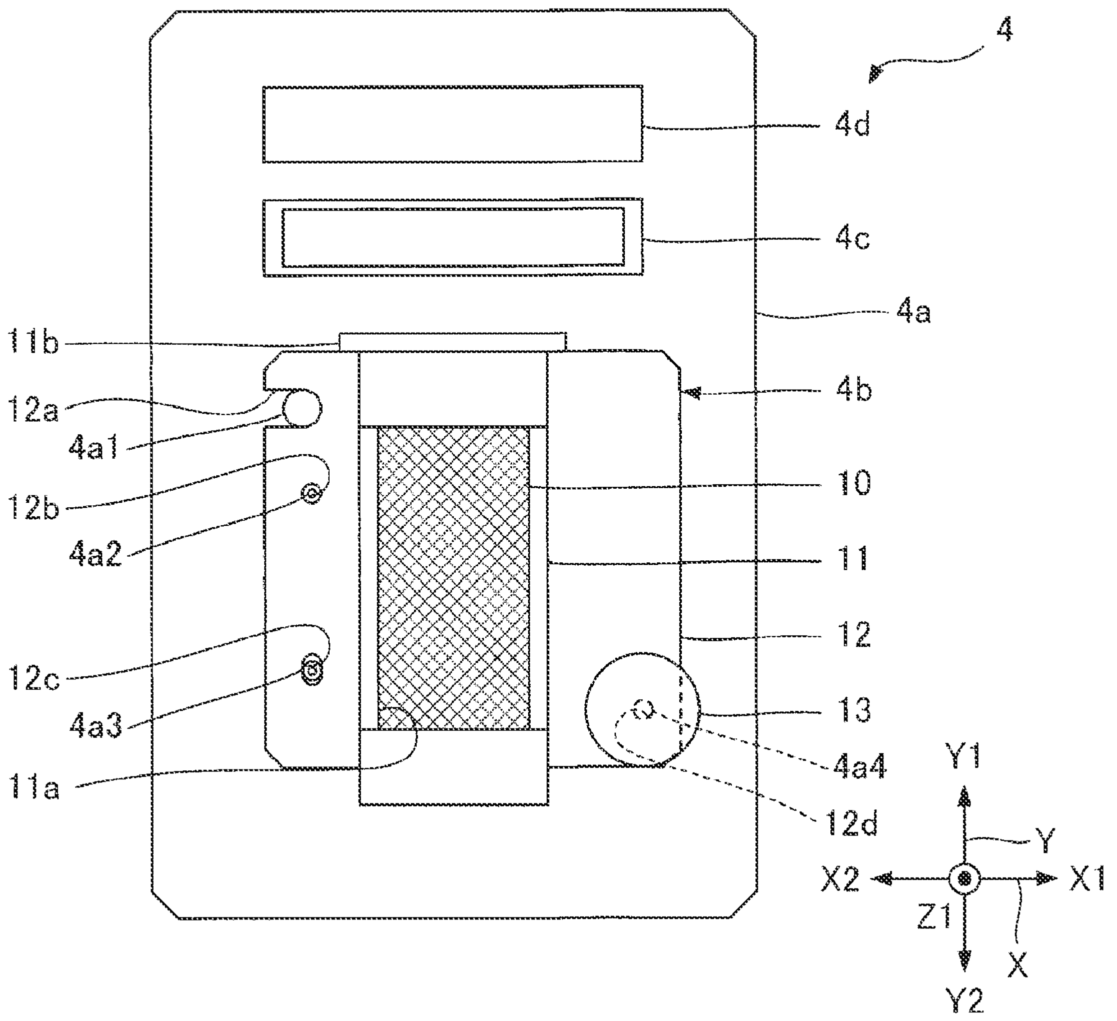
FIG. 4 is a plan view of a maintenance unit of the first embodiment.

FIG. 4 is a plan view of the maintenance unit 4 of the first embodiment. FIG. 4 illustrates a diagram of the maintenance unit 4 as viewed in the Z2 direction. The support table 4*a*, the wiping mechanism 4*b*, the suction cap 4*c*, and the plate cap 4*d* included in the maintenance unit 4 will be briefly explained in order below in accordance with FIG. 4.

The support table 4*a* is a structure that supports the wiping mechanism 4*b*, the suction cap 4*c*, and the plate cap 4*d* and is made of, for example, a metal or the like. In the example illustrated in FIG. 4, the wiping mechanism 4*b*, the suction cap 4*c*, and the plate cap 4*d* are supported on the surface of the support table 4*a* facing the Z1 direction. The wiping mechanism 4*b*, the suction cap 4*c*, and the plate cap 4*d* are lined in this order in the Y1 direction. Each of the wiping mechanism 4*b*, the suction cap 4*c*, and the plate cap 4*d* is fixed to the support table 4*a* by screwing or the like. Here, the support table 4*a* has pins 4*a*1, 4*a*2, and 4*a*3 and a screw hole 4*a*4 on the surface facing the Z1 direction for positioning and fixation of the wiping mechanism 4*b*.

The wiping mechanism 4*b* is a structure for wiping the nozzle surface FN of the head 3*a*. The wiping mechanism 4*b* includes the wiping member 10, the support member 11, a mounting base 12, and a fixation screw 13.

The wiping member 10 includes an absorption member having an ink absorption property. The absorption member is, for example, a cloth such as a woven fabric or a nonwoven fabric or a sponge having continuous pores. Here, when the absorption member has a sheet shape, the absorption member is used as the wiping member 10 in a rolled state. Note that when the absorption member is a sponge, the absorption member may have a pillar shape or a block shape.

In the present embodiment, the wiping member 10 has a shape elongated along the Y-axis.

The support member 11 is configured to support the wiping member 10. In the example illustrated in FIG. 4, the support member 11 has a bottomed tubular shape having one open end and has an internal space for housing the wiping member 10. Here, the support member 11 has an opening 11*a*, a bottom plate 11*b*, and a hole 11*c*. The opening 11*a* is located at a portion in the circumferential direction of the support member 11 and is a space connecting the inside and outside in an axial direction. The bottom plate 11*b* is a plate-shaped member that closes one end of the support member 11. The hole 11*c* is a space surrounded by the inner peripheral surface of the support member 11.

In the present embodiment, the support member 11 has a shape elongated along the Y-axis. The opening 11*a* also has a shape elongated along the Y-axis. Hence, the portion of the wiping member 10 exposed through the opening 11*a* has a shape elongated along the Y-axis.

The mounting base 12 is a member to which the support member 11 is fixed. Although not illustrated, the support member 11 is fixed to the mounting base 12 by screwing or the like. In the example illustrated in FIG. 4, the mounting base 12 has a plate shape. The mounting base 12 has a recess 12*a* and holes 12*b*, 12*c*, and 12*d*. The pin 4*a*1 of the support table 4*a* is inserted into the recess 12*a*. The pin 4*a*2 of the support table 4*a* is inserted into the hole 12*b*. The pin 4*a*3 of the support table 4*a* is inserted into the hole 12*c*. The fixation screw 13 is inserted into the hole 12*d*. The fixation screw 13 is fastened to the screw hole 4*a*4 of the support table 4*a*. The wiping mechanism 4*b* is positioned and fixed to the support table 4*a* by using the recess 12*a*, the holes 12*b*, 12*c*, and 12*d*, the pins 4*a*1, 4*a*2, and 4*a*3, and the screw hole 4*a*4 mentioned above. With the fixing method mentioned above, it is possible to fix the support member 11 stably to the support table 4*a* and also remove the support member 11 at a specified time such as when the wiping member 10 is replaced, and this improves the convenience.

The suction cap 4*c* is a lid member having a recess configured to cover the nozzle surface FN of the head 3*a* and is made of, for example, an elastic material such as a rubber material or an elastomer material. The suction cap 4*c* has a suction port (not illustrated) open in a wall surface of the recess, and the suction port is coupled to a suction mechanism (not illustrated). The suction mechanism is configured to decompress the inside of the suction cap 4*c* and includes, for example, a decompression tank and a decompression pump. With this decompression, ink is sucked from the nozzles N of the head 3*a* with the nozzle surface FN covered with the suction cap 4*c*. Thus, the ink in the nozzles N is refreshed.

The plate cap 4*d* is a plate-shaped lid member that covers the nozzle surface FN of the head 3*a* and, unlike the suction cap 4*c*, does not have a recess. The plate cap 4*d* is made of, for example, an elastic material such as a rubber material or an elastomer material. By covering the nozzle surface FN with the plate cap 4*d*, it is possible to prevent air in the recesses from entering the head 3*a* through the nozzles N when ink in the head 3*a* is circulated or when the head 3*a* is initially charged with ink.

Figure 5:
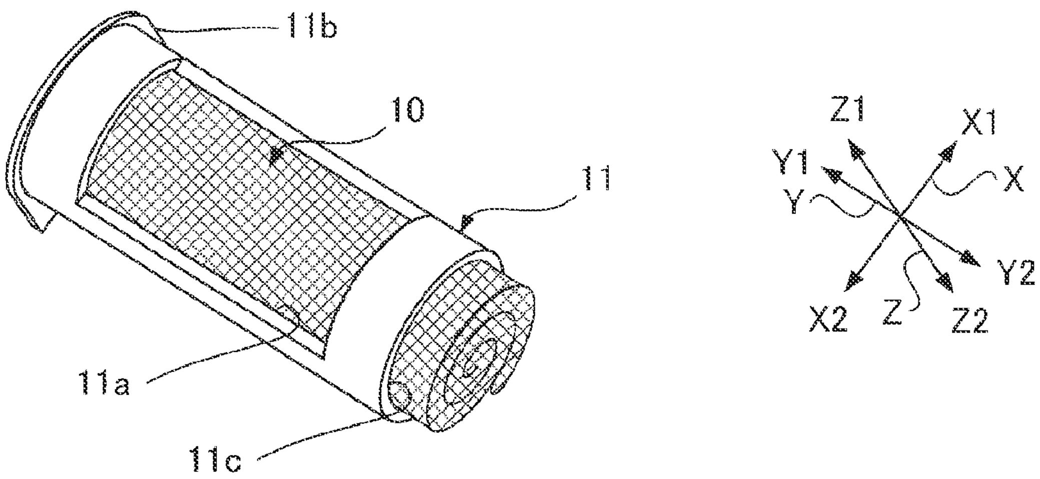
FIG. 5 is a perspective view of a wiping member and support member of the first embodiment.
Figure 6:
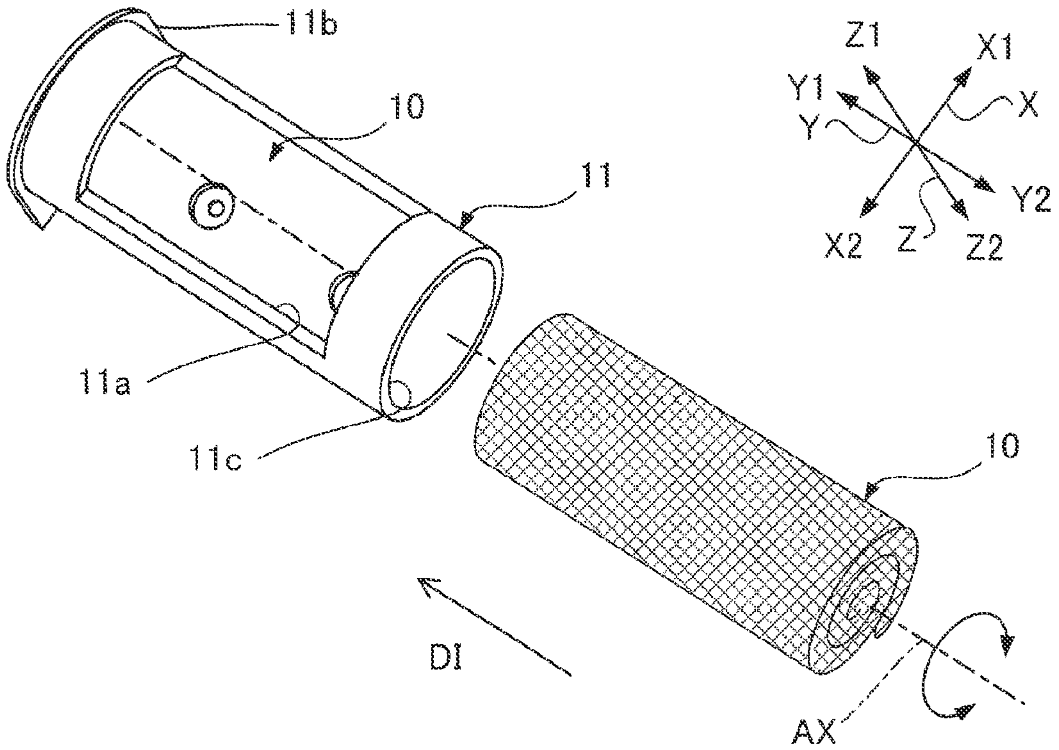
FIG. 6 is a diagram for explaining attaching the wiping member to the support member of the first embodiment.

FIG. 5 is a perspective view of the wiping member 10 and the support member 11 of the first embodiment. FIG. 6 is a diagram for explaining attaching the wiping member 10 to the support member 11 of the first embodiment. In the example illustrated in FIG. 5, the wiping member 10 is a sheet-shaped absorption member in a rolled state. As illustrated in FIG. 6, the wiping member 10 is inserted through one end of the support member 11 along the axis AX which is the center axis of the support member 11 and housed in the support member 11. With this operation, a portion of the wiping member 10 is exposed through the opening 11*a*. In this state, a force to unfold the wiping member 10 in the radial directions acts on the support member 11. The wiping member 10 is supported in the support member 11 by this action.

In this state, the wiping member 10 is rotatable around the axis AX relative to the support member 11. With this configuration, the portion of the wiping member 10 exposed through the opening 11*a*can be changed by rotating the wiping member 10 around the axis AX.

1-5. Wiping Operation

Figure 7:
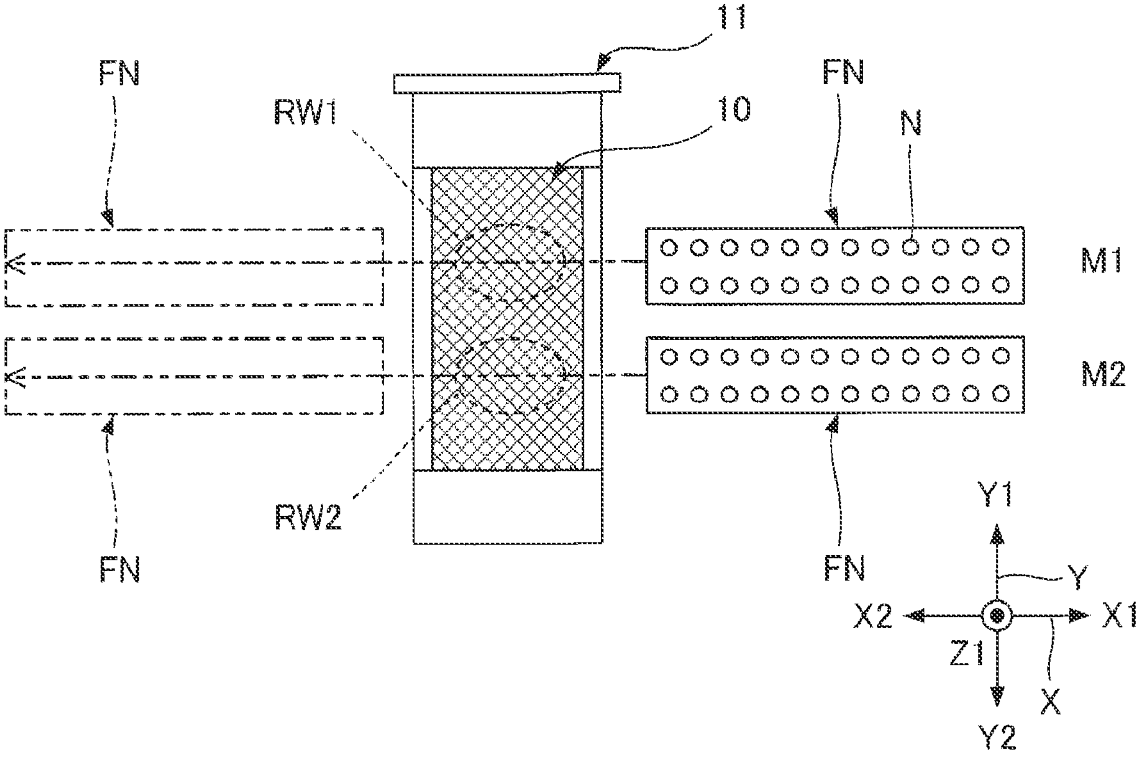
FIG. 7 is a diagram for explaining a first wiping operation and second wiping operation of the first embodiment.
Figure 8:
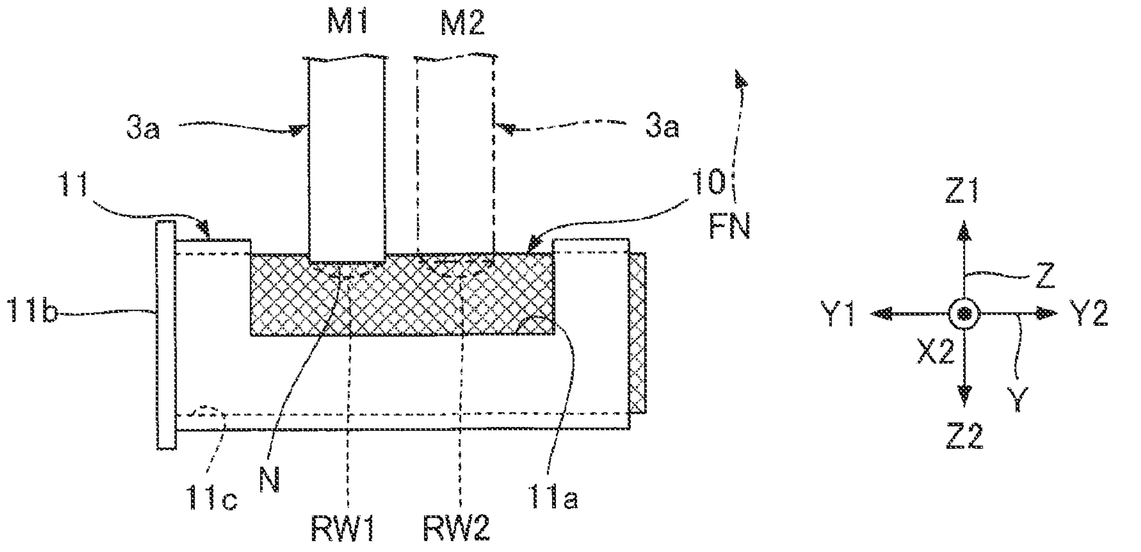
FIG. 8 is a diagram for explaining the first wiping operation and second wiping operation of the first embodiment.

FIGS. 7 and 8 are diagrams for explaining a first wiping operation M1 and a second wiping operation M2 of the first embodiment. FIG. 7 illustrates movement paths of the nozzle surface FN as viewed in the Z2 direction. FIG. 8 illustrates the positions of the nozzle surface FN as viewed in the X1 direction. In FIG. 8, the head 3*a* executing the first wiping operation M1 is depicted by solid lines, and the head 3*a* executing the second wiping operation is depicted by dashed double-dotted lines.

In the present embodiment, as illustrated in FIG. 7, the robot 2 moves the nozzle surface FN in the X2 direction in each of the first wiping operation M1 and the second wiping operation M2. In this operation, the nozzle surface FN moves from a position in the X1 direction to a position in the X2 direction relative to the wiping member 10 with the arrangement direction DN, which is the longitudinal direction of the nozzle surface FN, parallel to the X-axis. As illustrated in FIG. 8, in the period while the nozzle surface FN is passing on the wiping member 10, the nozzle surface FN is in contact with the wiping member 10. With this operation, the entire area of the nozzle surface FN from one end to the other end in the longitudinal direction is wiped by the wiping member 10 in both wiping operations.

Here, the nozzle surface FN comes into contact with a first wiping area RW1 of the wiping member 10 in the first wiping operation M1, while the nozzle surface FN comes into contact with a second wiping area RW2 of the wiping member 10 in the second wiping operation M2. The first wiping area RW1 and the second wiping area RW2 are areas different from each other in the longitudinal direction of the wiping member 10. In the example illustrated in FIG. 7, the first wiping area RW1 is located in the Y1 direction relative to the second wiping area RW2.

As has been described above, the printing apparatus 1 includes the wiping member 10, the head 3*a*, and the robot 2 which is an example of a movement mechanism. The wiping member 10 extends in the Y-axis which is an example of a first axis. The head 3*a* has the nozzle surface FN provided with the nozzles N that eject ink which is an example of a liquid. The robot 2 changes the relative positional relationship between the wiping member 10 and the head 3*a*.

Then, the printing apparatus 1 executes the first wiping operation M1 and the second wiping operation M2. In the first wiping operation M1, the position of the head 3*a* relative to the wiping member 10 is changed along the X-axis, with the nozzle surface FN and the first wiping area RW1 of the wiping member 10 in contact with each other. Here, the X-axis is an example of a second axis intersecting the first axis. In the second wiping operation M2, the position of the head 3*a* relative to the wiping member 10 is changed along the X-axis, with the nozzle surface FN and the second wiping area RW2 of the wiping member 10, located at a position different from that of the first wiping area RW1 in the direction along the Y-axis, in contact with each other.

In the printing apparatus 1 mentioned above, since the extending direction of the wiping member 10 and the longitudinal direction of the nozzle surface FN intersect each other, one wiping operation does not stain the entire area of the wiping member 10 in the extending direction. Hence, different areas in the wiping member 10, specifically, the first wiping area RW1 and the second wiping area RW2, can be used in the first wiping operation M1 and the second wiping operation M2. Thus, it is possible to wipe the nozzle surface FN suitably.

In the present embodiment, as described earlier, the wiping member 10 includes an absorption member having an ink absorption property. Thus, the wiping member in the present embodiment provides better wiping performance than the one including an elastic member.

As described earlier, the printing apparatus 1 further includes the support member 11 that supports the absorption member composing the wiping member 10. The support member 11 has the hole 11*c* and the opening 11*a*. The absorption member composing the wiping member 10 is inserted into the hole 11*c*. The opening 11*a* exposes part of the absorption member composing the wiping member 10 which includes the first wiping area RW1 and the second wiping area RW2. Thus, it is possible to make a wiping mechanism containing the wiping member 10 including the absorption member with a simple structure.

Further, as described earlier, the absorption member composing the wiping member 10 is supported by the support member 11 so as to be rotatable around the axis AX in the direction DI in which the absorption member is inserted into the support member 11. Then, by rotating the absorption member around the axis AX relative to the support member 11, the first wiping area RW1 and the second wiping area RW2 exposed through the opening 11*a* are changed. With this configuration in a simple structure, it is possible to refresh the first wiping area RW1 and the second wiping area RW2.

2. Second Embodiment

A second embodiment of the present disclosure will be described below. In the following embodiment illustrated as an example, the elements having the actions and functions the same as or similar to those in the first embodiment are denoted by the same reference numerals used in the first embodiment, and detailed description thereof is omitted as appropriate.

Figure 9:
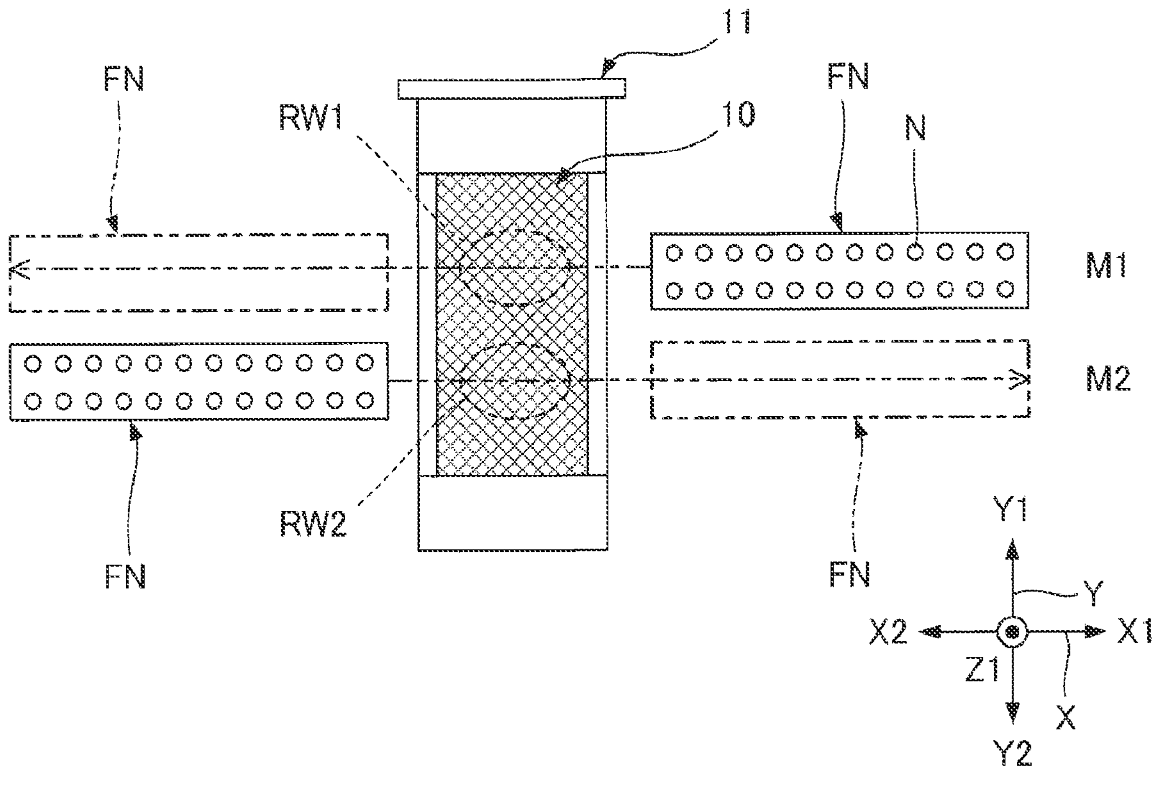
FIG. 9 is a diagram for explaining a first wiping operation and second wiping operation of a second embodiment.

FIG. 9 is a diagram for explaining a first wiping operation M1 and a second wiping operation M2 of the second embodiment. The present embodiment is the same as or similar to the foregoing first embodiment except that the movement directions of the nozzle surface FN in the first wiping operation M1 and the second wiping operation M2 are opposite to each other.

In the first wiping operation M1, the nozzle surface FN moves in the X2 direction relative to the wiping member 10. In contrast, in the second wiping operation M2, the head 3*a* moves in the X1 direction relative to the wiping member 10.

The second embodiment described above is also capable of suitably wiping the nozzle surface FN. In the present embodiment, as described above, the head 3*a* moves in the X2 direction which is an example of the first direction along the X-axis relative to the wiping member 10 in the first wiping operation M1, while the head 3*a* moves in the X1 direction which is an example of the second direction opposite to the first direction relative to the wiping member 10 in the second wiping operation M2. Thus, even if remaining ink is present at the nozzle surface FN, an imbalance of the ink can be reduced. As a result, it is possible to reduce the occurrence of directional errors of ink ejection or the like resulting from remaining ink on the nozzle surface FN.

3. Third Embodiment

A third embodiment of the present disclosure will be described below. In the following embodiment illustrated as an example, the elements having the actions and functions the same as or similar to those in the first embodiment are denoted by the same reference numerals used in the first embodiment, and detailed description thereof is omitted as appropriate.

Figure 10:
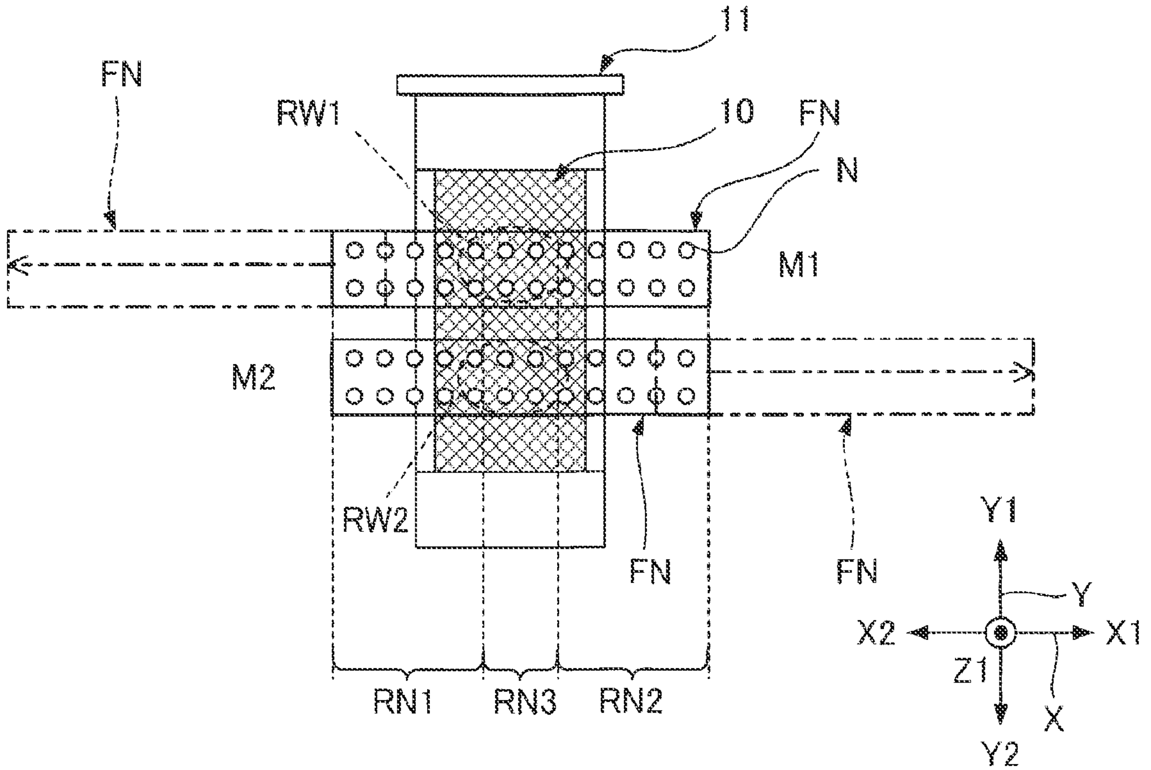
FIG. 10 is a diagram for explaining a first wiping operation and second wiping operation of a third embodiment.

FIG. 10 is a diagram for explaining a first wiping operation M1 and a second wiping operation M2 of the third embodiment. The present embodiment is the same as or similar to the foregoing first embodiment except that the movement directions of the nozzle surface FN in the first wiping operation M1 and the second wiping operation M2 are opposite to each other, and that the start positions at which the nozzle surface FN comes into contact with the wiping member 10 are different. In other words, the present embodiment is the same as or similar to the foregoing second embodiment except that the start positions at which the nozzle surface FN comes into contact with the wiping member 10 are different.

In the present embodiment, the start position at which the nozzle surface FN comes into contact with the wiping member 10 is near the center of the nozzle surface FN in the longitudinal direction in both the first wiping operation M1 and the second wiping operation M2.

As described earlier, the nozzle surface FN has an elongated shape. Then, the nozzle surface FN has a first nozzle area RN1 that is closer to one end than to the center in the longitudinal direction of the nozzle surface FN, a second nozzle area RN2 that is closer to the other end than to the center in the longitudinal direction of the nozzle surface FN, and a third nozzle area RN3 that is between the first nozzle area RN1 and the second nozzle area RN2. In the first wiping operation M1, the first wiping area RW1 wipes the nozzle surface FN from the third nozzle area RN3 toward the first nozzle area RN1. In the second wiping operation M2, the second wiping area RW2 wipes the nozzle surface FN from the third nozzle area RN3 toward the second nozzle area RN2.

The third embodiment described above is also capable of suitably wiping the nozzle surface FN. In the present embodiment, as described above, after the third nozzle area RN3 is first brought into contact with the wiping member 10, the position of the contact with the wiping member 10 is changed toward the first nozzle area RN1 or the second nozzle area RN2. In this operation, the operation range of one wiping operation can be shorter than in the case in which the entire area of the nozzle in the longitudinal direction is wiped in one wiping operation. Thus, this configuration reduces situations in which the ink collected from the start to the end of one wiping operation remains on the nozzle surface FN after the wiping operation is finished. The closer to the center in the longitudinal direction of the nozzle surface FN the position is, the greater effects to the image quality it has, and the area closer to the center than the ends in the longitudinal direction of the nozzle surface FN is wiped in both the first wiping operation M1 and the second wiping operation M2. Thus, it is possible to reduce deterioration in the image quality.

4. Fourth Embodiment

A fourth embodiment of the present disclosure will be described below. In the following embodiment illustrated as an example, the elements having the actions and functions the same as or similar to those in the first embodiment are denoted by the same reference numerals used in the first embodiment, and detailed description thereof is omitted as appropriate.

Figure 11:
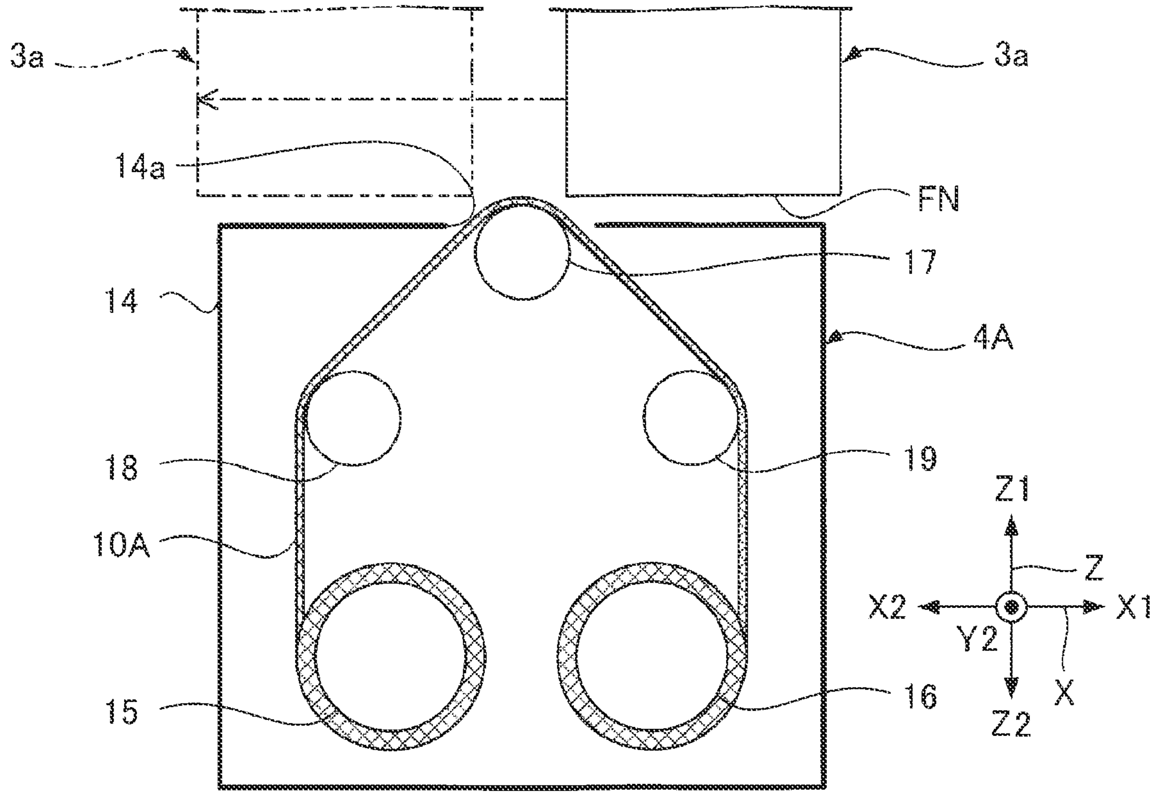
FIG. 11 is a schematic diagram of a wiping mechanism including a wiping member of a fourth embodiment.

FIG. 11 is a schematic diagram of a wiping mechanism 20 including a wiping member 10A of the fourth embodiment. The present embodiment is the same as or similar to the foregoing first embodiment except that the wiping mechanism 20 is used instead of the wiping mechanism 4*b*.

The wiping mechanism 20 includes a wiping member 10A, a housing 14, a first reel 15, a second reel 16, a backup roller 17, and tension rollers 18 and 19.

The wiping member 10A is a belt-shaped absorption member having an ink absorption property. The wiping member 10A has a portion wound around the first reel 15 in a roll shape, a portion wound around the second reel 16, and a portion in contact with the backup roller 17 and the tension rollers 18 and 19 between these reels.

The housing 14 is a box member that houses the wiping member 10A, the first reel 15, the second reel 16, the tension rollers 18 and 19, and the backup roller 17. The housing 14 has an opening 14*a*. From the opening 14*a*, a portion of the wiping member 10A in contact with the backup roller 17 is exposed to the outside of the housing 14.

The first reel 15 is a rotatable roller-shaped member, and the portion of the wiping member 10A unused for wiping is wound around the first reel 15.

The second reel 16 is a roller-shaped member that is rotationally driven, and the portion of the wiping member 10A used for wiping is wound around the second reel 16. Although not illustrated, the second reel 16 is coupled to a driving mechanism such as a motor that rotationally drives the second reel 16.

The backup roller 17 is a rotatable roller-shaped member and is configured to be in contact with the wiping member 10A from the inside of the housing 14. Here, the portion of the wiping member 10A exposed through the opening 14*a* is where the nozzle surface FN in wiping operation comes into contact. In this operation, the wiping member 10A is nipped between the backup roller 17 and the nozzle surface FN.

In other words, the portion of the wiping member 10A exposed through the opening 14*a* extends in the direction along the Y-axis and is used for wiping the nozzle surface FN. Here, although not illustrated, this portion has a first wiping area RW1 and a second wiping area RW2. Then, as in one of the foregoing first to third embodiments, a first wiping operation M1 is executed by moving the nozzle surface FN in the direction along the X-axis with the nozzle surface FN in contact with the first wiping area RW1. Similarly, a second wiping operation is performed by moving the nozzle surface FN in the direction along the X-axis with the nozzle surface FN in contact with the second wiping area RW2.

The tension roller 18 is in contact with the wiping member 10A at a position between the first reel 15 and the backup roller 17 to adjust the tension of the wiping member 10A. The tension roller 19 is in contact with the wiping member 10A at a position between the second reel 16 and the backup roller 17 to adjust the tension of the wiping member 10A. Note that one or both of the tension rollers 18 and 19 are provided as necessary, or they may be omitted.

The fourth embodiment described above is also capable of suitably wiping the nozzle surface FN. In the present embodiment, as described above, the wiping mechanism 20 has an absorption member composing the wiping member 10A. The absorption member has a belt shape. Then, the wiping mechanism 20 has the first reel 15 around which the absorption member composing the wiping member 10A is wound in a roll shape and the second reel 16 that takes up the absorption member from the first reel 15. With this configuration, it is possible to refresh the first wiping area RW1 and the second wiping area RW2 easily. This refreshing operation may be performed manually or automatically. In addition, the housing 14, the backup roller 17, and the tension rollers 18 and 19 in the present embodiment are provided as necessary, and one or more of these may be omitted.

5. Fifth Embodiment

A fifth embodiment of the present disclosure will be described below. In the following embodiment illustrated as an example, the elements having the actions and functions the same as or similar to those in the first embodiment are denoted by the same reference numerals used in the first embodiment, and detailed description thereof is omitted as appropriate.

Figure 12:
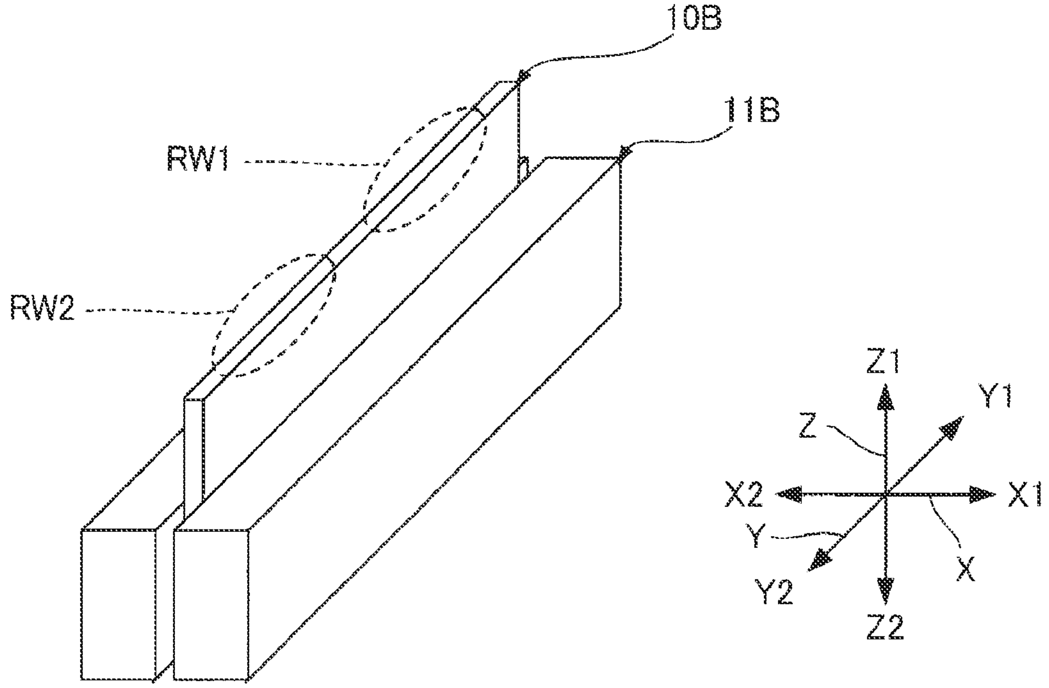
FIG. 12 is a perspective view of a wiping member and support member of a fifth embodiment.

FIG. 12 is a perspective view of a wiping member 10B and a support member 11B of the fifth embodiment. The present embodiment is the same as or similar to the foregoing first embodiment except that the wiping member 10B and the support member 11B are used instead of the wiping member 10 and the support member 11.

The wiping member 10B has a blade shape and is composed of an elastic member such as rubber or elastomer. In the example illustrated in FIG. 12, the wiping member 10B has a thickness direction extending in the direction along the X-axis and has a shape extending in the direction along the Y-axis.

Here, the edge in the Z1 direction of the wiping member 10B extends in the direction along the Y-axis and is used for wiping the nozzle surface FN. Here, this edge has a first wiping area RW1 and a second wiping area RW2. Then, as in one of the foregoing first to third embodiments, a first wiping operation M1 is executed by moving the nozzle surface FN in the direction along the X-axis with the nozzle surface FN in contact with the first wiping area RW1. Similarly, a second wiping operation is performed by moving the nozzle surface FN in the direction along the X-axis with the nozzle surface FN in contact with the second wiping area RW2.

The support member 11B supports the wiping member 10B. In the example illustrated in FIG. 12, the support member 11B includes two members that hold the wiping member 10B in the thickness direction. The two members are fixed to each other by screwing or the like such that an area of the wiping member 10B in the Z2 direction relative to the center of the wiping member 10B in the direction along the Z-axis is elastically deformed in the thickness direction. The wiping member 10B is supported by the support member 11B with this configuration.

The fifth embodiment described above is also capable of suitably wiping the nozzle surface FN. In the present embodiment, as described above, the wiping member 10B is composed of an elastic member. Thus, it is possible to make the wiping member 10B that provides stable wiping performance with a simple structure.

6. Modification Examples

Each configuration in the above examples may be modified in various ways. The configurations of specific modifications applicable to the foregoing embodiments will be described below as examples. Note that any two or more configurations selected from the following examples may be combined as appropriate within a range in which these configurations do not make a contradiction.

6-1. Modification Example 1

Although the foregoing embodiments are based on the examples in which a 6-axis vertical articulated robot is used as the robot, the present disclosure is not limited to this configuration. The robot may be, for example, a vertical articulated robot other than ones with six axes or may be a horizontal articulated robot. The arm portion of the robot may include an expansion-contraction mechanism or the like in addition to the rotation portions including rotation mechanisms. However, an articulated robot with six or more axes may be preferable from the viewpoint of the balance between the print quality in print operation and the degree of freedom of the robot movement in non-print operation.

6-2. Modification Example 2

The foregoing embodiments are based on the examples in which the method of fixing the head to the robot is screwing or the like, the disclosure is not limited to this configuration. For example, a holding mechanism such as a hand may be attached to the robot as an end effector, and the head may be fixed to the robot by the holding mechanism holding the head. An alternative configuration may be such that the head is provided at a position stationary relative to the base portion of the robot, that a wiping member is attached to the distal end of the robot, and that the wiping member is moved by the operation of the robot.

6-3. Modification Example 3

Although the foregoing embodiments are based on the examples in which an articulated robot is used as the movement mechanism that changes the relative positional relationship between the head and the wiping member, the present disclosure is not limited to this configuration. Any movement mechanism can be used that is capable of changing the relative positional relationship between the head and the wiping member.

6-4. Modification Example 4

Although the foregoing embodiments are based on the examples in which printing is performed with one kind of ink, the present disclosure is not limited to this configuration. The present disclosure is also applicable to configurations in which two or more kinds of ink are used in printing.

6-5. Modification Example 5

Uses for the printing apparatus of the present disclosure are not limited to printing. For example, a printing apparatus that ejects a colorant solution is used as a manufacturing apparatus that forms a color filter for a liquid crystal display apparatus. A printing apparatus that ejects a solution containing a conductive material is used as a manufacturing apparatus that forms wiring and electrodes of wiring substrates. A printing apparatus may also be used as a jet dispenser that applies a liquid such as an adhesive onto a medium.

What is claimed is:

1. A printing apparatus comprising:

a wiping member extending along a first axis;

a head including a nozzle surface having a nozzle configured to eject liquid; and a robot configured to change a relative positional relationship between the wiping member and the head, the head being fixed at a distal end of an arm of the robot, wherein the nozzle surface has an elongated shape, the nozzle surface has a first nozzle area that is closer to one end than to a center in a longitudinal direction of the nozzle surface, a second nozzle area that is closer to the other end than to the center in the longitudinal direction of the nozzle surface, and a third nozzle area that is between the first nozzle area and the second nozzle area, the printing apparatus executes a first wiping operation in which the robot moves the head relative to the wiping member along a second axis intersecting the first axis, with the nozzle surface and a first wiping area of the wiping member in contact with each other, the second axis being along the along the longitudinal direction of the nozzle surface, and a second wiping operation in which the robot moves the head relative to the wiping member along the second axis, with the nozzle surface and a second wiping area of the wiping member in contact with each other, the second wiping area being located at a position different from a position of the first wiping area in a direction along the first axis, the first wiping area wipes the nozzle surface from the third nozzle area toward the first nozzle area and does not wipe the second nozzle area in the first wiping operation, and the second wiping area wipes the nozzle surface from the third nozzle area toward the second nozzle area and does not wipe the first nozzle area in the second wiping operation.

2. The printing apparatus according to claim 1, wherein the wiping member includes an elastic member.

3. The printing apparatus according to claim 1, wherein the wiping member includes an absorption member having a liquid absorption property.

4. The printing apparatus according to claim 3, further comprising a support member configured to support the absorption member, wherein the support member has a hole into which the absorption member is inserted and an opening through which part of the absorption member is exposed, the part including the first wiping area and the second wiping area.

5. The printing apparatus according to claim 4, wherein the absorption member is supported by the support member so as to be rotatable around an axis in a direction in which the absorption member is inserted into the support member, and the first wiping area and the second wiping area exposed through the opening are changed by rotating the absorption member around the axis relative to the support member.

6. The printing apparatus according to claim 3, further comprising a wiping mechanism including the absorption member, wherein the absorption member has a belt shape, and the wiping mechanism has a first reel around which the absorption member is wound in a roll shape, and a second reel configured to take up the absorption member from the first reel.

7. The printing apparatus according to claim 3, further comprising the support member that is configured to support the wiping member and has an opening though which the wiping member is exposed.

8. The printing apparatus according to claim 1, wherein the first wiping area is closer to a base portion of the robot than the second wiping area in the direction along the first axis.

9. The printing apparatus according to claim 1, further comprising a cap that is configured to cover the nozzle surface and is positioned between a base portion of the robot and the wiping member in the direction along the first axis.

* * * * *